Sept. 21, 1965     C. M. HOBSON, JR., ETAL     3,207,644
METHOD OF MAKING A FLUOROCARBON RESIN JACKETED GASKET
Filed July 20, 1959
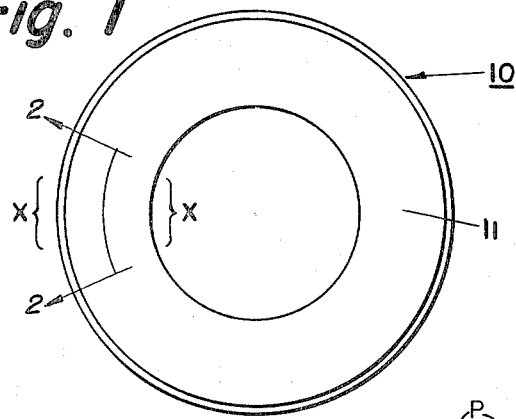
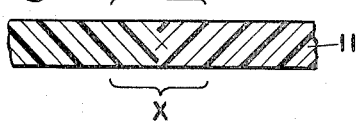
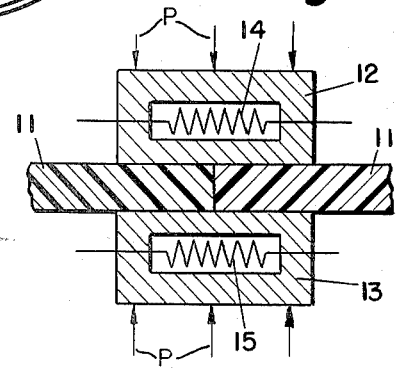
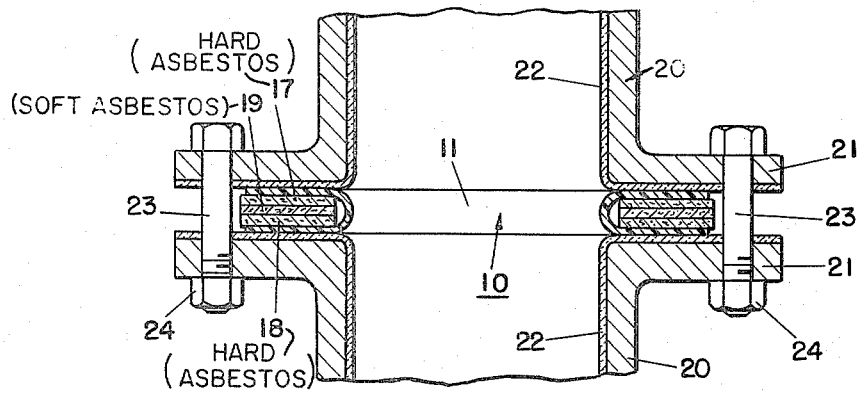

United States Patent Office 3,207,644
Patented Sept. 21, 1965

3,207,644
METHOD OF MAKING A FLUOROCARBON
RESIN JACKETED GASKET
Charles M. Hobson, Jr., Camden, and William J. Kelly,
Lindenwold, N.J., assignors, by mesne assignments, to
Garlock Inc., Palmyra, N.Y., a corporation of New
York
Filed July 20, 1959, Ser. No. 828,366
1 Claim. (Cl. 156—217)

This invention relates to gaskets of the type having jackets of fluorocarbon resin and has for an object the provision of butt-welded jacketed gaskets and the method of manufacturing the same. The outer fluorocarbon resin surface of the gasket may be modified and rendered non-slippery, as disclosed and claimed in the divisional application Serial No. 142,736 of Charles M. Hobson, Jr., now U.S. Patent No. 3,174,764. Though particularly applicable to gaskets having outer surfaces of polytetrafluoroethylene available on the market under the trademary "Teflon," the invention can also be used in regard to gaskets having an outer surface of polychlorotrifluoroethylene available on the market under the trademark "Kel-F."

Teflon and Kel-F resins have characteristics which make the materials quite valuable for gaskets and particularly suitable for jacketed gaskets. Such resins are stable at high temperatures and chemically resistant to acids and other corrosive substances except fluorine at elevated temperature and molten sodium. By reason of these characteristics, gaskets having an outer layer or covering of Teflon or Kel-F have become extremely important for use in chemical piping and associated equipment. Many of these gaskets are used in applications involving the joining of glass-lined steel equipment, piping and the like which in itself provides a very slippery surface. Teflon and Kel-F, being such slippery materials when utilized in contact with the slippery glass surfaces, require excessive bolt-loading pressure on the joints which frequently damages the glazed lining, resulting in expensive repairs. This condition is due specifically to engaging high anti-friction surfaces and another cause of failure because of this condition is the shifting of the gasket during installation. Further, under high vacuum service, this condition has caused the jacket to be pulled completely into the vessel or pipeline.

It is an object of the invention to provide a jacketed gasket in which the jacket is made from Teflon or Kel-F tape which has been butt-welded to form an endless ring and thereby eliminate the condition of double thickness and non-uniform thickness of the gasket jacket normally found in conventional lap-welded joints.

For further objects and advantages of the invention and for a more detailed disclosure thereof, reference is to be had to the following description taken in conjunction with the accompanying drawing in which:

FIG. 1 is a top plan view of a jacketed gasket embodying the present invention;

FIG. 2 is a sectional view taken across the butt-welded portion of the jacket as indicated by lines 2—2 in FIG. 1;

FIG. 3 diagrammatically illustrates the manner of butt-welding the ends of the tape to form the jacket into an endless ring; and FIG. 4 is a sectional view of a joint between two flanged sections of glass-lined pipe with the gasket of FIG. 1 inserted therebetween.

Referring to FIGS. 1 and 4, the gasket 10 includes an outer layer or jacket 11 of fluorocarbon resin in the form of polytetrafluoroethylene tape or equivalent. The tape is relatively thin, for example in the order of .015" thick. The length and width of the tape required to form the jacket 11 will depend upon the size of the joint which is to receive the gasket. The gaskets, when completed, are in ring form and it is not unusual for them to have an O.D. as great as 60 inches.

To form the tape into a jacket for the gasket, the tape is first cut to proper length and folded lengthwise along the center thereof into a U-shape as shown by the cross-section of the jacket 11 in FIG. 4. The longitudinal edges of the tape are then pressed away from the center fold, as by tapered rollers to stretch the tape along the edges and thus cause the folded tape to form into a ring with the ends thereof in abutting relation. The tape is then unfolded at the ends and the ends placed in abutting relation for welding.

As indicated in FIG. 3, the ends of the tape 11 are butt-welded by the concurrent application of heat and pressure. This has been schematically illustrated in FIG. 3 by the pressure arrows P associated with the upper and lower pressure blocks 12 and 13 which are heated by suitable means, such, for example as the heat resistor elements 14 and 15, the latter being energized from a suitable source, not shown. It will be noted that the pressure blocks 12 and 13 have a width sufficient to extend a substantial distance on either side of the abutting ends of the tape 11. With this arrangement, the ends of the tape will be tightly welded together as indicated at area $x$ in FIG. 2 with only a small reduction in thickness of the tape at that area. This is particularly desirable since it provides an endless ring or jacket 11 for the gasket which is substantially uniform in thickness throughout the entire circumference of the ring. This eliminates the condition of double thickness and non-uniform thickness of the gasket jacket which is normally found in lap-welded joints and which presents a source of leakage when the gasket is assembled in a joint, such as illustrated in FIG. 4.

In welding the ends of the tape together to form the butt-weld, the temperature utilized with Teflon is in the order of 700° F. (with Kel-F 500° F.), the pressure is in the order of about 20 to 40 pounds per square inch throughout the area of the blocks 12 and 13 and the pressure and temperature are maintained over a period of about one to two minutes, after which the welded area of the jacket is quenched in water.

After the foregoing operations, the jacket 11 is then ready to be assembled about an inner gasket to form a completed gasket 10 as shown in FIGS. 1 and 4. The inner gasket may comprise a single ring of suitable resilient or compressible material or it may comprise a plurality of rings. For example, as shown in FIG. 4, the inner gasket comprises a plurality of rings 17, 18 and 19, the center ring 19 being a relatively soft asbestos material while the outer rings 17 and 18 are a relatively hard compressed asbestos. It is to be understood that other inner gasket rings may be utilized such, for example, as those of the type disclosed in Hobson Patent 2,580,546.

The pipe joint illustrated in FIG. 4 is of the type in which the pipe 20 and flanges 21 are provided with a glass lining 22. The flanges 21 are provided with series of holes extending around the periphery thereof through which a series of bolts 23 extend. The bolts 23 are provided with nuts 24 which are adapted to be tightened until the loading on the gasket 10 is sufficient to retain it within its central location between the flanges 21, 21 and in axial alignment with the mating pipe sections 20, 20.

What is claimed is:

The method of making a fluorocarbon resin jacketed gasket comprising the steps of:

cutting a flat strip of flurorocarbon resin tape to proper length and folding it lengthwise along the center thereof into a U-shape, pressing the longitudinal edges of the tape away from the center fold to stretch the tape along the edges and thus cause the folded tape to form into a ring with the ends thereof in abutting relation, unfolding the tape at the ends and placing the ends in abutting relation for welding, welding only said abutting ends together to form an endless ring of tape having a substantially uniform thickness throughout the circumference of the ring including the area of the weld, and assembling said endless ring of tape with an inner gasket with the inner surface of said endless ring being exposed to provide the opposed surfaces of said jacketed gasket.

References Cited by the Examiner

UNITED STATES PATENTS

| | | | |
|---|---|---|---|
| 1,161,430 | 11/15 | Wiedeman | 285—363 |
| 1,978,019 | 10/34 | Haushalter | 285—55 |
| 2,239,509 | 4/41 | Uecher | 285—363 |
| 2,459,720 | 1/49 | Poltorak | 288—55 |
| 2,580,546 | 1/52 | Hobson | 277—232 |
| 2,597,976 | 5/52 | Cousins | 154—43 |
| 2,717,024 | 9/55 | Jelinek | 154—33.1 |
| 2,765,023 | 10/56 | Fagg | 154—33.1 |
| 2,767,768 | 10/56 | Jelinek | 154—33.1 |
| 2,789,063 | 4/57 | Purvis. | |
| 2,833,686 | 5/58 | Sandt | 156—309 |
| 2,868,575 | 1/59 | Hawxhurst | 277—228 |
| 2,964,065 | 12/60 | Haroldson et al. | 138—76 |

ALEXANDER WYMAN, *Primary Examiner.*

CARL W. TOMLIN, EARL M. BERGERT, *Examiners.*